United States Patent Office 3,322,620
Patented May 30, 1967

3,322,620
COMPOSITIONS AND METHODS FOR CONTROLLING FUNGI WITH ISOCYANIDE DIHALIDES
Paul-Ernst Frohberger, Burscheid, Bezirk, Dusseldorf, and Engelbert Kühle, Cologne-Stammheim, Germany, assignors to Farbenfabriken Bayer Aktiengesellschaft, Leverkusen, Germany, a German corporation
No Drawing. Filed July 30, 1963, Ser. No. 298,563
Claims priority, application Germany, Aug. 1, 1962, F 37,483
20 Claims. (Cl. 167—30)

The present invention concerns the use, as fungicides, of known isocyanide-dihalides.

It had not previously been known that isocyanide-dihalides and chemically similar compounds can be employed as fungicides.

It is an object of the present invention to provide novel fungicidal agents. A further object of the invention consists in the provision of those fungicidal agents which exhibit a low toxicity towards warm-blooded creatures. Other objects of the invention are evident from the following description and the examples.

It has now been found that isocyanide-dihalides of the formula

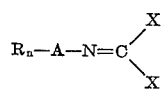

wherein

X denotes chlorine and bromine,
A denotes an aromatic radical with up to 10 carbon atoms or a hydroaromatic radical with 5–10 carbon atoms,
R denotes halogen, nitro, alkyl, halogenoalkyl, aryl, halogenoaryl, alkoxy, phenyldiazo, and/or the group

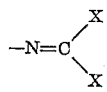

and $n$ is a number between 0 and 5, can be employed as fungicides.

It must be regarded as distinctly surprising that the isocyanide-dihalides to be employed according to the invention exhibit very strong fungicidal properties since it had not hitherto been known that chemically similar compounds also possess fungicidal properties. The fungicidal agents according to the invention thus constitute a valuable addition to technology.

The isocyanide-dihalides to be employed according to the invention are clearly characterised by the above mentioned Formula I. In this formula, X denotes chlorine and bromine, A preferably phenyl and naphthyl, as well as mononuclear hydroaromatic radicals with 5–6 carbon atoms and also binuclear hydroaromatic radicals with 9–10 carbon atoms. R preferably represents chlorine, bromine, fluorine, nitro, alkyl with 1–4 carbon atoms, halogenoalkyl with 1–4 carbons atoms, phenyl, halogenophenyl, alkoxy with 1–4 carbon atoms, phenyldiazo, and an

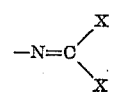

group; $n$ preferably denotes 0 to 5.

The isocyanide-dihalides to be employed according to the invention are prepared, for instance, according to German patent specification No. 1,094,737.

The compounds to be employed according to the present invention exhibit a strong fungicidal activity at a low toxicity towards warm-blooded creatures and may therefore be applied for the control of phytopathogenic fungi. They are suitable as control agents against fungi which live upon or within organs of living plants, such as root, shoot, leaf, flower, and fruit, and in addition particularly as soil fungicides and seed dressings. The following may be mentioned as examples of phytopathogenic fungi which can be controlled by means of seed dressings and soil treatments: smut fungi such as *Tilletia tritici*, *Ustilago avenae*, and other fungi from the genera Rhizoctonia, Fusarium, and Pythium.

The genera Pythium, Rhizoctonia, and Sclerotium as well as Phytophthora may be mentioned as examples of soil fungi.

The compounds according to the invention may be applied by themselves or in the form of the usual compositions, such as emulsifiable concentrates, spray powders, pastes, soluble powders, dusting agents, and granulates. These are prepared, by way of example, in Agricultural Chemicals, March 1960, pages 35–38. The chief auxiliaries for this purpose are: solvents such as aromatic hydrocarbons (for instance xylene, benzene), chlorinated aromatic hydrocarbons (for instance chlorobenzenes), paraffins (for instance petroleum fractions), alcohols (for instance methanol, butanol), amines (for instance ethanolamine, dimethylformamide), and water; carriers such as ground natural minerals (for instance kaolins, aluminas, talc, chalk) and ground synthetic minerals (for instance finely dispersed silica, silicates); emulsifying agents such as nonionic and anionic emulsifiers (for instance polyhydroxyethylene esters of fatty acids, polyhydroxyethylene ethers of aliphatic alcohols, alkyl sulphonates, and aryl sulphonates); and dispersing agents such as lignin, spent sulphite liquors, and methyl cellulose.

The active agents according to the invention may be present in the compositions in the form of mixtures with other known active agents, such as other plant protection agents and cultivation assistants.

In general, the compositions contain between 0.1 and 95 percent by weight tof the active agent, preferably between 0.5 and 90 percent.

The application of the isocyanide-dihalides and of their compositions is carried out by the usual methods, for instance by spraying, vapourising, watering, dusting, dispersing, soil injections, and dry, damp, wet, and slurry dressing.

The following examples serve to illustrate the invention in detail. The compounds listed individually in the following table and described as I to XXI were investigated for their fungicidal activity by various tests.

fluidised potato-dextrose-agar agar and these mixtures are poured into petri dishes whilst maintaining sterile conditions. After the agar agar has solidified, the plates are

| Product No. | Constitution | Product No. | Constitution |
|---|---|---|---|
| (I) | C₆H₅—N=CCl₂ | (II) | (H-substituted phenyl)—N=CCl₂ |
| (III) | Cl—C₆H₄—N=CCl₂ (para) | (IV) | Cl—C₆H₄—N=CCl₂ (ortho) |
| (V) | 2,3-Cl₂—C₆H₃—N=CCl₂ | (VI) | 2,4-Cl₂—C₆H₃—N=CCl₂ |
| (VII) | 2,5-Cl₂—C₆H₃—N=CCl₂ | (VIII) | 2,4,6-Cl₃—C₆H₂—N=CCl₂ |
| (IX) | 2,4,5-Cl₃—C₆H₂—N=CCl₂ | (X) | 2,4-Cl,Cl₄—C₆H₃—N=CCl₂ |
| (XI) | 2,3,4,5,6-Cl₅—C₆—N=CCl₂ | (XII) | Br—C₆H₄—N=CCl₂ |
| (XIII) | 2,4-Br₂—C₆H₃—N=CCl₂ | (XIV) | NO₂—C₆H₄—N=CCl₂ |
| (XV) | Cl,CH₃—C₆H₃—N=CCl₂ | (XVI) | Cl,CF₃—C₆H₃—N=CCl₂ |
| (XVII) | Cl,Cl,CH₃—C₆H₂—N=CCl₂ | (XVIII) | CCl₂=N—C₆H₄—N=CCl₂ |
| (XIX) | CCl₂=N—C₆H₃(Cl)—N=CCl₂ | (XX) | C₆H₅—N=N—C₆H₄—N=CCl₂ |
| (XXI) | 2-(N=CCl₂)-biphenyl | | |

(1) *Test of the inhibiting activity of the agents according to the invention in respect of fungus growth*

In each case, 10 or 100 mg. portions of the above mentioned active agents are mixed at 60° C. with 1 l. of fluidised potato-dextrose-agar agar and these mixtures are poured into petri dishes whilst maintaining sterile conditions. After the agar agar has solidified, the plates are inoculated with the eight different fungi described below, whose mycelium growth at room temperature is evaluated after 3 days. The results obtained are summarised in Table 1.

TABLE I.—INHIBITING ACTIVITY IN RESPECT OF MYCELIUM GROWTH BY AN AGAR AGAR PLATE TEST

| Product No. | Corticium rolfsii | | Sclerotinia sclerotiorum | | Verticillium alboatrum | | Thielaviopsis basicola | | Phytophthora cactorum | | Fusarium culmorum | | Fusarium oxysporum | | Fusarium solani f. pisi | |
|---|---|---|---|---|---|---|---|---|---|---|---|---|---|---|---|---|
| | (a) | (b) | (a) | (b) | (a) | (b) | (a) | (b) | (a) | (b) | (a) | (b) | (a) | (b) | (a) | (b) |
| I | | | | | | | | | | – | | 0 | | | | |
| II | | 0 | | 0 | | | | 0 | | 0 | | 0 | | – | | |
| III | | 0 | | 0 | | | | 0 | | 0 | | 0 | | 0 | | 0 |
| IV | 0 | 0 | 0 | 0 | | 0 | | 0 | | – | | 0 | | 0 | | 0 |
| V | 0 | 0 | 0 | 0 | 0 | 0 | 0 | 0 | 0 | 0 | 0 | 0 | 0 | 0 | | 0 |
| VI | 0 | 0 | 0 | 0 | 0 | 0 | 0 | 0 | 0 | 0 | 0 | 0 | 0 | 0 | – | 0 |
| VII | 0 | 0 | 0 | 0 | | 0 | 0 | 0 | | – | | 0 | 0 | 0 | 0 | 0 |
| VIII | 0 | 0 | – | 0 | | 0 | | 0 | | 0 | | 0 | | 0 | | |
| IX | 0 | 0 | 0 | 0 | 0 | 0 | 0 | 0 | 0 | 0 | 0 | 0 | 0 | 0 | 0 | |
| X | 0 | 0 | | | | | | | | | | | 0 | 0 | 0 | 0 |
| XI | 0 | 0 | | | | | | | | | | | | | | |
| XII | | 0 | | 0 | | | | 0 | | 0 | | 0 | | 0 | | 0 |
| XIII | 0 | 0 | 0 | 0 | – | – | 0 | 0 | | 0 | | 0 | 0 | 0 | 0 | 0 |
| XIV | 0 | 0 | 0 | 0 | 0 | 0 | 0 | 0 | 0 | 0 | 0 | 0 | 0 | 0 | 0 | 0 |
| XV | 0 | 0 | | | | | | | | | | | | | | |
| XVI | | 0 | | 0 | | 0 | | – | | 0 | | 0 | | 0 | | 0 |
| XVII | 0 | 0 | | 0 | | 0 | | 0 | | 0 | 0 | 0 | | 0 | | 0 |
| XVIII | | 0 | | | | | | | | 0 | | 0 | | 0 | | |
| XIX | 0 | 0 | | 0 | | 0 | – | 0 | – | 0 | | 0 | | 0 | | 0 |

Inhibiting activity on mycelium growth by (a) 10 p.p.m. and (b) 100 p.p.m. of the chemical in the substrate. Inoculation with small mycelium plates.
–=mycelium growth only on the small inoculating plate.
0=no mycelium growth either on the treated substrate or on the small inoculation plate.

(2) *Test of contact fungicide activity during seed treatment*

The suitability as seed dressings of the fungicides to be employed according to the present invention in order to combat fungus diseases in plants was investigated by the following method:

(A) Wheat seed is contaminated with 5 g. of virulent chlamydospores of *Tilletia tritici* per kg. of seed material (about 100,000 spores per grain) and it is subsequently treated by the usual method, employing dry dressings containing the above mentioned active agents at the stated concentrations. The wheat grains which are covered with spores and treated are thereafter placed on damp loam and covered with compost soil in a gauze bag, and exposed to optium germination conditions for the spores at 10° C. The resultant spore germination or the inhibition of germination by the products to be employed according to the invention is evaluated microscopically 10 days later. This shows, for instance, that spore germination is completely suppressed with the aid of products XX and XXI when 1 g. of either of them is applied to 1 kg. of seed material, in the form of a 30% powder. Analogous application of products XI and XVIII almost completely prevents spore germination, although germination is practically complete in the case of untreated seed material.

(B) Sugar beet seed which had quite naturally become infected with the fungus *Phoma betae* causing root rot is treated by the usual method with dry dressings containing the above specified products as the active agents, at a rate of 6 g. per kg. of seed material. The seed grains are then sown in damp quartz sand, causing germination and emergence at temperatures between 10 and 12° C. Losses due to *Phoma betae* or the success of control attained by the products according to the invention are evaluated three weeks later by counting the healthy plants. Whilst 100 untreated sown beet seeds produce 140 healthy plants, the development of 177 and 170 healthyl plants, respectively, is made possible by the above described disinfection with 300 mg. of the products III and XV per kg. of seed material. Very strongly diseased seed material, which led to the development of only 21 healthy plants from 100 untreated seeds produced 85 healthy plants after treatment with 300 mg. of compound XII, per kg. of seed material.

(C) Healthy pea seed material which is however susceptible to seedling infections is treated with the above mentioned active agents by the method normal for dry dressings and is sown into artificially contaminated Fruhstorf standard soil, by comparison with treated seed material. Plant development is affected at temperatures of about 18° C. The healthy plants are counted 3 weeks after sowing. Their number indicates the protective effect attained by disinfection with the agents according to the invention by comparison with the untreated control. The following results are attained:

TABLE 2

| Product | Concn. of product in dry dressing composition, as percent | Rate of application of the dry dressing composition, as g./kg. of seed material | Number of healthy pea plants, as percent, 3 weeks after sowing |
|---|---|---|---|
| Sterilised, untreated Fruhstorf standard soil | | | 92 |
| Sterilised Fruhstorf standard soil, inoculated with *Rhizoctonia solani*; Untreated | | | 27 |
| V | 5 | 2 | 40 |
| | 15 | 2 | 74 |
| | 50 | 2 | 92 |
| VII | 5 | 2 | 24 |
| | 15 | 2 | 40 |
| | 50 | 2 | 82 |
| XIII | 5 | 2 | 26 |
| | 15 | 2 | 34 |
| | 50 | 2 | 88 |

(3) Test of effectiveness against soil fungi

The utility of the products according to the invention as soil fungicides was evaluated by the following method:

Healthy pea and cotton seeds which are however susceptible towards soil fungi are sown in Fruhstorf standard soil which had in each case been inoculated with one of the various soil fungi listed in the following table. In addition, ordinary compost soil with natural contamination is also employed, and it was known from experience that canning peas (wrinkled peas) are affected by *Pythium ultimum* in this soil. The number of healthy plants found 3 weeks after sowing by comparison with the untreated control characterises the protective effect as soil fungicides of the products to be employed according to the present invention, which are mixed homogeneously with the soil in the form of dry powders. The test results obtained are summarised in Table 3.

TABLE 3

| Product | Conc. of active agent in soil, as mg./l. | Number of healthy plants 3 weeks after sowing, as percent, after attack by— | | | |
|---|---|---|---|---|---|
| | | *Rhizoctonia solani* on peas | *Fusarium culmorum* on peas | *Pythium ultimum* on peas | *Thielaviopsis basicola* on cotton |
| Sterilised soil, untreated | | 93 | 93 | 94 | 82 |
| Contaminated soil, untreated | | 0 | 18 | 5 | 8 |
| III | 100 | | 61 | | |
| IV | 100 | 59 | | | 78 |
| V | 1 | | | | 52 |
| | 5 | | | | 87 |
| | 25 | 52 | 32 | | |
| | 100 | 85 | 46 | | |
| VI | 25 | 33 | 48 | 22 | |
| | 100 | 65 | | 67 | |
| VII | 5 | 23 | | | |
| | 25 | 31 | | | |
| | 100 | 64 | | | |
| VIII | 25 | 38 | | | |
| | 100 | 61 | | | |
| IX | 100 | 66 | 28 | | |
| XII | 100 | 45 | 64 | | |
| XIII | 100 | 81 | | 37 | |
| XV | 100 | 62 | | | |
| XVI | 100 | 74 | | 33 | |
| XVII | 25 | 50 | | | |
| | 100 | 75 | | | 66 |
| XIX | 100 | 82 | | 61 | |

We claim:

1. A method for controlling fungi, which comprises applying to said fungi a fungicidal amount of an isocyanide-dihalide of the formula

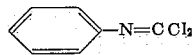

2. A method for controlling fungi, which comprises applying to said fungi a fungicidal amount of an isocyanide-dihalide of the formula

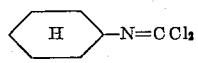

3. A method for controlling fungi, which comprises applying to said fungi a fungicidal amount of an isocyanide-dihalide of the formula

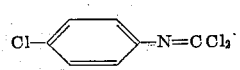

4. A method for controlling fungi, which comprises applying to said fungi a fungicidal amount of an isocyanide-dihalide of the formula

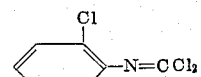

5. A method for controlling fungi, which comprises applying to said fungi a fungicidal amount of an isocyanide-dihalide of the formula

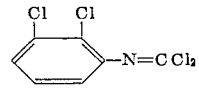

6. A method for controlling fungi, which comprises applying to said fungi a fungicidal amount of an isocyanide-dihalide of the formula

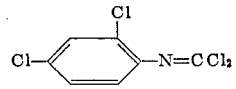

7. A method for controlling fungi, which comprises applying to said fungi a fungicidal amount of an isocyanide-dihalide of the formula

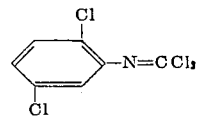

8. A method for controlling fungi, which comprises applying to said fungi a fungicidal amount of an isocyanide-dihalide of the formula

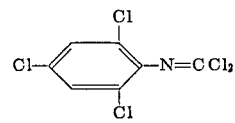

9. A method for controlling fungi, which comprises applying to said fungi a fungicidal amount of an isocyanide-dihalide of the formula

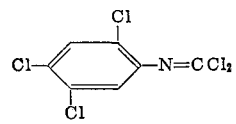

10. A method for controlling fungi, which comprises applying to said fungi a fungicidal amount of an iso-cyanide-dihalide of the formula

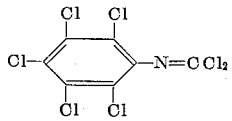

11. A method for controlling fungi, which comprises applying to said fungi a fungicidal amount of an iso-cyanide-dihalide of the formula

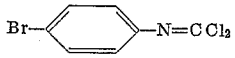

12. A method for controlling fungi, which comprises applying to said fungi a fungicidal amount of an iso-cyanide-dihalide of the formula

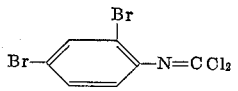

13. A method for controlling fungi, which comprises applying to said fungi a fungicidal amount of an iso-cyanide-dihalide of the formula

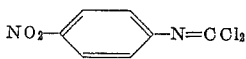

14. A method for controlling fungi, which comprises applying to said fungi a fungicidal amount of an iso-cyanide-dihalide of the formula

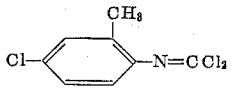

15. A method for controlling fungi, which comprises applying to said fungi a fungicidal amount of an iso-cyanide-dihalide of the formula

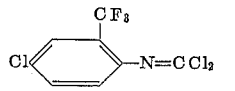

16. A method for controlling fungi, which comprises applying to said fungi a fungicidal amount of an iso-cyanide-dihalide of the formula

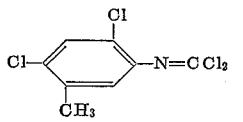

17. A method for controlling fungi, which comprises applying to said fungi a fungicidal amount of an iso-cyanide-dihalide of the formula

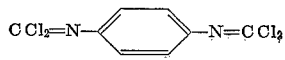

18. A method for controlling fungi, which comprises applying to said fungi a fungicidal amount of an iso-cyanide-dihalide of the formula

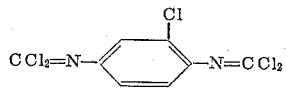

19. A method for controlling fungi, which comprises applying to said fungi a fungicidal amount of a compound of the formula

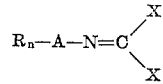

wherein

X is a member selected from the group consisting of chloro and bromo;

A is a member selected from the group consisting of phenyl, naphthyl and cyclohexyl;

R is a member selected from the group consisting of chloro, bromo, fluoro, nitro, alkyl of 1–4 carbon atoms, haloalkyl of 1–4 carbon atoms, phenyl, halophenyl, alkoxy of 1–4 carbon atoms,

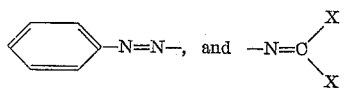

and $n$ is an integer of 0–5.

20. A composition consisting essentially of about .1–95% by weight of a compound of the formula

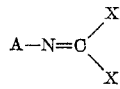

wherein

A is a member selected from the group consisting of pentachlorophenyl, cyclohexyl and phenyl substituted phenyl, and X is a member selected from the group consisting of chloro and bromo.

References Cited

UNITED STATES PATENTS 3,164,515  1/1965  Homeyer et al. _____ 167—30

FOREIGN PATENTS 1,094,737  12/1960  Germany.

ALBERT T. MEYERS, *Primary Examiner.*

SAM ROSEN, *Examiner.*

JULIAN S. LEVITT, GEORGE A. MENTIS,
*Assistant Examiners.*